United States Patent Office 3,466,302
Patented Sept. 9, 1969

3,466,302
POLYCARBOXYLIC ACIDS DERIVED FROM SUBSTITUTED ALKYLCYCLOHEXENES
Garson P. Shulman, Baltimore, Md., and Freeman M. Young, Brookhaven, Pa., assignors, by mesne assignments, to Ashland Oil and Refining Company, a corporation of Delaware
No Drawing. Filed Dec. 20, 1965, Ser. No. 515,210
Int. Cl. C08g 51/80; C07c 51/32, 51/34
U.S. Cl. 260—346.8                                    7 Claims

ABSTRACT OF THE DISCLOSURE

A novel class of polycarboxylic acids are provided by the ozonization of a Diels-Alder adduction product obtained by reacting a conjugated octadecadienyl compound and a low molecular weight mono-olefin. These polybasic acids exhibit usefulness as curing agents for synthetic polymers such as polyisocyanates, polyepoxides, and the like.

---

This invention relates to novel polyfunctional compounds which are derivatives of substituted alkylcyclohexenes and more particularly to novel polyfunctional compounds which are derivatives of Diels-Alder adducts of octadecadienyl compounds and low molecular weight ethylenically unsaturated monomers and which contain at least two —OH, $CO_2H$, —CHO, or —$NH_2$ groups. The invention further relates to a method for preparing said novel polyfunctional compounds.

It is known in the prior art to utilize polyfunctional monomeric compounds as curing agents for synthetic polymers containing reactive sites, such as polyurethanes, polyureas, epoxy resins and the like. In such cases, the use of the polyfunctional compounds advantageously provides highly cross-linked structures having three-dimensional rigidity from initially fluid or semisolid polymers. While in some instances it is satisfactory to employ a particular polyfunctional compound merely because it is adapted to impart rigidity to the final cured polymer, generally the particular cross-linking agent utilized in a specific instance is selected for use due to its ability to contribute materially to the over-all properties of the ultimate polymer. In certain instances, it is desired to provide a cured polymeric material which has dimensional stability but yet is relatively flexible. The cross-linking agents previously proposed many times have not proven to be completely suitable in preparing cross-linked resins having such characteristics and it has been necessary to employ supplemental materials such as plasticizers and the like to obtain the desired resinous products. Of those polyfunctional curing agents which do have the ability to yield cross-linked polymers characterized by satisfactorily balanced levels of rigidity and flexibility, a significant number is not completely suitable for use due to the costs entailed in synthesizing same.

Accordingly, it is the primary object of the present invention to provide novel polyfunctional compounds advantageously adapted to be utilized in the curing and cross-linking of reactive polymeric substances.

It is a further object of the present invention to provide novel polyfunctional compounds which are useful as crosslinking agents for reactive polymers and which simply and economically may be prepared from readily available starting materials.

It is another object of the present invention to provide novel polyfunctional compounds which advantageously are adapted to be utilized in the cross-linking of reactive synthetic polymers to prepare satisfactorily rigid yet flexible and/or pliable final polymeric substances.

Still an additional object of the present invention is to provide a method for preparing said novel polyfunctional compounds from substituted alkylcyclohexenes.

Broadly described, the present invention provides a polyfunctional compound represented by the following formula:

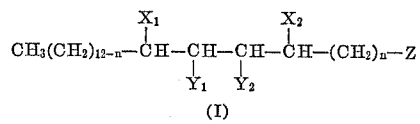

(I)

wherein $n$ is an integer of from 1 to 11 inclusive; each $X_1$ and $X_2$ is a radical selected from the group consisting of —$CO_2H$, —CHO, —$CH_2OH$, and —$CH_2NH_2$; Z is a radical selected from the group consisting of

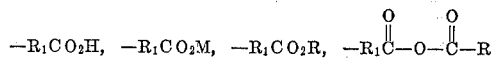

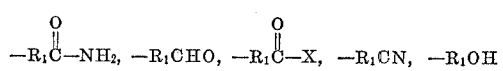

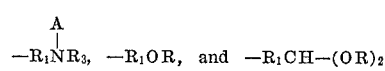

and each $Y_1$ and $Y_2$ is a radical selected from the group consisting of —H, —X, —R, and Z, wherein X is halogen (i.e., chlorine, bromine, iodine or fluorine), $R_1$ is selected from the group consisting of a carbon-to-carbon bond and alkylene radicals, R is lower alkyl (i.e., methyl, ethyl, propyl, isopropyl, etc.), and M is a cation (i.e., alkali metal, such as sodium, potassium, etc. or ammonium), and A is an anion (i.e., chloride, bromide, methyl sulfate, etc.), and wherein $Y_1$ and $Y_2$ when taken together form a bivalent radical —$Y_1$—$Y_2$— which is

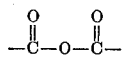

Specific examples of the embodiments of the polyfunctional compounds of the invention represented by Formula I above wherein Z is —$CO_2H$ include, without limitation, those correspondingly provided when $X_1$ and $X_2$ are —$CO_2H$ and the nature of $n$, $Y_1$ and $Y_2$ is as given below in table.

TABLE

| $X_1$ | $X_2$ | $Y_1$ | $Y_2$ | $n$ |
|---|---|---|---|---|
| —$CO_2H$ | —$CO_2H$ | —H | —H | 1 |
| —$CO_2H$ | —$CO_2H$ | —H | -$CH_3$ | 2 |
| —$CO_2H$ | —$CO_2H$ | —$CH_3$ | —$CH_2CH_3$ | 3 |
| —$CO_2H$ | —$CO_2H$ | —H | —$CH_2OH$ | 4 |
| —$CO_2H$ | —$CO_2H$ | —H | —Cl | 5 |
| —$CO_2H$ | —$CO_2H$ | —H | —Br | 6 |
| —$CO_2H$ | —$CO_2H$ | —H | —I | 7 |
| —$CO_2H$ | —$CO_2H$ | —Cl | —Cl | 8 |
| —$CO_2H$ | —$CO_2H$ | —H | —$CO_2H$ | 9 |
| —$CO_2H$ | —$CO_2H$ | —H | —$CO_2CH_3$ | 11 |
| —$CO_2H$ | —$CO_2H$ | —H | —$CO_2CH_2CH_3$ | 6 |
| —$CO_2H$ | —$CO_2H$ | —H | —H | 5 (7) |
| —$CO_2H$ | —$CO_2H$ | —H | —$CH_3$ | 5 (7) |
| —$CO_2H$ | —$CO_2H$ | —$CH_3$ | —$CH_2CH_3$ | 5 (7) |
| —$CO_2H$ | —$CO_2H$ | —H | —$CH_2OH$ | 5 (7) |
| —$CO_2H$ | —$CO_2H$ | —H | —Cl | 5 (7) |
| —$CO_2H$ | —$CO_2H$ | —H | —F | 5 (7) |
| —$CO_2H$ | —$CO_2H$ | —H | —Br | 5 (7) |
| —$CO_2H$ | —$CO_2H$ | —H | —I | 5 (7) |
| —$CO_2H$ | —$CO_2H$ | —Cl | —Cl | 5 (7) |
| —$CO_2H$ | —$CO_2H$ | —H | —$CO_2H$ | 5 (7) |
| —$CO_2H$ | —$CO_2H$ | —H | —$CO_2CH_3$ | 5 (7) |
| —$CO_2H$ | —$CO_2H$ | —H | —$CO_2CH_2CH_3$ | 5 (7) |
| —$CO_2H$ | —$CO_2H$ | —H | —CN | 5 (7) |
| —$CO_2H$ | —$CO_2H$ | —H | —C(O)—O—C(O)—$CH_3$ | 5 (7) |
| —$CO_2H$ | —$CO_2H$ | —H | —C(O)—O—C(O)—$CH_2CH_3$ | 5 (7) |

TABLE

| $X_1$ | $X_2$ | $Y_1$ | $Y_2$ | n |
|---|---|---|---|---|
| —$CO_2H$ | —$CO_2H$ | —H | —$CH_2$—$\overset{Cl}{N}$—$(CH_3)_3$ | 5 (7) |
| —$CO_2H$ | —$CO_2H$ | —H | —$CH_2OCH_3$ | 5 (7) |
| —$CO_2H$ | —$CO_2H$ | —H | —$CH_2OCS_2CH_3$ | 5 (7) |
| —$CO_2H$ | —$CO_2H$ | —H | —$CH_2$—$\overset{Cl}{N}$—$(CH_2CH_3)_3$ | 5 (7) |
| —$CO_2H$ | —$CO_2H$ | —H | —CH—$(OCH_3)_2$ | 5 (7) |
| —$CO_2H$ | —$CO_2H$ | —H | —CH—$(OCH_2CH_3)_2$ | 5 (7) |
| —$CO_2H$ | —$CO_2H$ | —H | —$\overset{O}{\overset{\|}{C}}$—$NH_2$ | 5 (7) |
| —$CO_2H$ | —$CO_2H$ | —$CO_2H$ | —$CO_2H$ | 5 (7) |
| —$CO_2H$ | —$CO_2H$ | —$CH_3$ | —$CO_2H$ | 5 (7) |
| —$CO_2H$ | —$CO_2H$ | —$CH_3$ | —$CO_2CH_3$ | 5 (7) |
| —$CO_2H$ | —$CO_2H$ | —$CO_2H$ | —$\overset{O}{\overset{\|}{C}}$—$NH_2$ | 5 (7) |
| —$CO_2H$ | —$CO_2H$ | | —$\overset{O}{\overset{\|}{C}}$—O—$\overset{O}{\overset{\|}{C}}$— | 5 (7) |

Additional embodiments of the polyfunctional compounds of the invention represented by Formula I above wherein Z is —$CO_2H$ include those provided when $n$, $Y_1$ and $Y_2$ are as set forth in table above but $X_1$ and $X_2$, instead of being —$CO_2H$, are either —$CH_2OH$, —CHO, or —$CH_2NH_2$.

Further embodiments of the polyfunctional compounds of the invention represented by Formula I above include those correspondingly provided when $n$, $Y_1$, $Y_2$, $X_1$ and $X_2$ are as set forth above with respect to Z being —$CO_2H$, and Z represents —$CO_2CH_3$, —$CO_2CH_2CH_3$, —$\overset{O}{\overset{\|}{C}}$—O—$\overset{O}{\overset{\|}{C}}$—$CH_3$ —$\overset{O}{\overset{\|}{C}}$—O—$\overset{O}{\overset{\|}{C}}$—$CH_2CH_3$, —$\overset{O}{\overset{\|}{C}}$—$NH_2$, —CN, —$CH_2OH$, —$CH_2OCH_3$ —$CH_2OCH_2CH_3$, —$CH_2N(CH_3)_3$, —$CH_2\overset{Br}{\overset{\|}{N}}$—$(CH_2CH_3)_3$ —CH—$(OCH_3)_2$, or —CH—$(OCH_2CH_3)_3$ The preferred embodiments of the polyfunctional compounds are provided when $n$ is 5 or 7.

In accordance with the present invention, the polyfunctional compounds of Formula I are prepared by a method which involves treating Diels-Alder adducts of substituted octadecadienyl compounds and ethylenically unsaturated monomers with ozone to form an ozinide unsaturated monomer with ozone to form an ozinide and thereafter converting the ozonide intermediate into the polyfunctional compound wherein $X_1$ and $X_2$ have the desired nature by a selective treatment or the ozonide linkage of the intermediate with oxygen, hydrogen or ammonia in the presence of hydrogen. The reactions involved may be represented as follows:

wherein $n$, $Y_1$, $Y_2$ and Z are as described above with respect to Formula I.

The Diels-Alder adducts represented by Formula II above and employed in preparing the polyfunctional compounds of the invention may be prepared from the corresponding conjugated octadecadienyl compounds and low molecular weight mono-olefinically unsaturated monomers in accordance with techniques well known to the art to carry out Diels-Alder reactions. The particular conjugated octadecadienyl compound employed determines the value of $n$ and the nature of Z in the ozonide intermediates and ultimate polyfunctional compounds of the invention. The nature of $Y_1$ and $Y_2$ in the compounds of the invention are determined by the particular mono-olefin used in forming the Diels-Alder adduct starting material.

Specific examples of octadecadienyl compounds which can be employed in the preparation of the Diels-Alder adduct starting materials (Formula II) include the following:

$CH_3$—$(CH_2)_{11}$—CH=CH—CH=CH—$CH_2$—$CH_2H$ $CH_3$—$(CH_2)_{10}$—CH=CH—CH=CH—$(CH_2)_2$—$CH_2OH$ $CH_3$—$(CH_2)_8$—CH=CH—CH=CH—$(CH_2)_4$—$CO_2CH_3$ $CH_3$—$(CH_2)_7$—CH=CH—CH=CH—$(CH_2)_5$—$\overset{O}{\overset{\|}{C}}$—$NH_2$ $CH_3$—$(CH_2)_3$—CH=CH—CH=CH—$(CH_2)_9$—CN $CH_3$—$(CH_2)_2$—CH=CH—CH=CH—$(CH_2)_{10}$—$CH_2\overset{Cl}{\overset{\|}{N}}$—$(CH_3)_3$ $CH_3$—$(CH_2)_5$—CH=CH—CH=CH—$(CH_2)_7$—$CO_2H$ $CH_3$—$(CH_2)_5$—CH=CH—CH=CH—$(CH_2)_7$—$CH_2OH$ $CH_3$—$(CH_2)_5$—CH=CH—CH=CH—$(CH_2)_7$—$CO_2CH_3$ $CH_3$—$(CH_2)_5$—CH=CH—CH=CH—$(CH_2)_7$—$\overset{Cl}{\overset{\|}{C}}$—$NH_2$ $CH_3$—$(CH_2)_5$—CH=CH—CH=CH—$(CH_2)_7$—CN $CH_3$—$(CH_2)_4$—CH=CH—CH=CH—$(CH_2)_8$—$CO_2H$ $CH_3$—$(CH_2)_4$—CH=CH—CH=CH—$(CH_2)_8$—$CH_2OH$ $CH_3$—$(CH_2)_4$—CH=CH—CH=CH—$(CH_2)_8$—$CO_2CH_3$ $CH_3$—$(CH_2)_4$—CH=CH—CH=CH—$(CH_2)_8$—$\overset{O}{\overset{\|}{C}}$—$NH_2$ $CH_3$—$(CH_2)_4$—CH=CH—CH=CH—$(CH_)_8$—CN Specific examples of mono-olefinically unsaturated monomers which may be employed in forming the Diels-Alder adduct starting materials of Formula II generally contain from 2 to about 8 carbon atoms and include without limitation, olefinic hydrocarbons, such as ethylene, propylene, 1-butene, 2-butene, 1-pentene, 2-pentene, 1-hexene, 3-hexene, etc., olefinic alcohols and diols, vinyl acetate, 2-buten-1-ol, 3-buten-1-ol, 4-penten-1-ol, 2-penten-1-ol, 2-buten-1,4-diol, etc.; mono and polyhalogenated olefins, such as vinyl chloride, vinyl bromide, vinyl iodide, vinyl fluoride, allyl chloride, allyl bromide, 4-bromo-1-

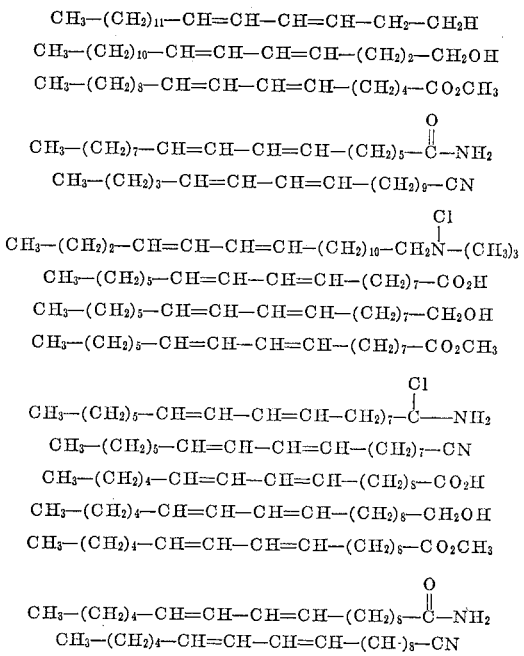

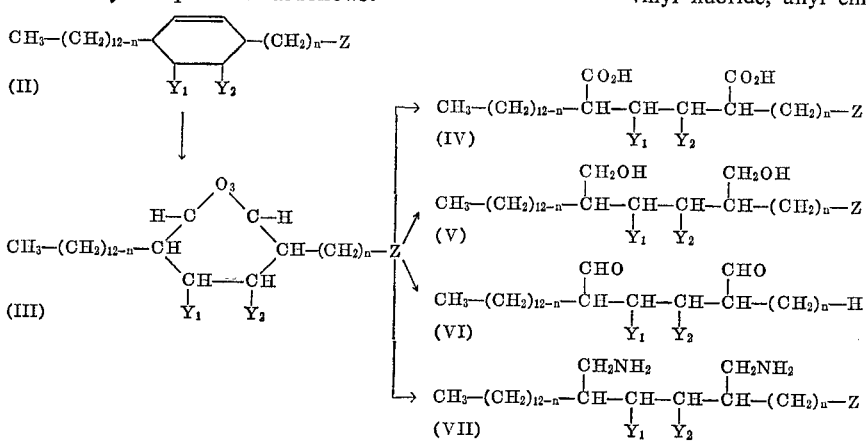

butene, acetylene dichloride, acetylene dibromide; olefinic mono and dibasic acids, such as acrylic acid, β-chloroacrylic acid, β-hydroxy acrylic acid, crotonic acid, 3-butenoic acid, 4-pentenoic acid, 4-methyl-2-pentenoic acid, maleic acid, etc.; lower alkyl esters and partial esters of said olefinic acids, such as methyl acrylate, ethyl acrylate, methyl crotonate, propyl crotonate, methyl vinyl acetate, methyl allyl acetate, dimethyl maleate, monomethylmaleate, etc.; amides of said olefinic acids, such as acrylamide, crotonamide, vinylacetamide, allylacetamide, maleamide, maleic acid monoamide, etc.; olefinically unsaturated nitriles, such as acrylonitrile, crotonic nitrile, vinylacetonitrile, allylacetonitrile, maleic nitrile, etc.; olefinically unsaturated anhydrides, such as acetic acrylic anhydride, propionic crotonic anhydride, maleic anhydride, etc.; olefinically unsaturated ethers, such as methyl vinyl ether, methyl allyl ether, 3,3-dimethoxy-propene, 3,3-diethoxy-propene, etc.

In preparing the polyfunctional compounds of the invention, the ozonide intermediates may be prepared by carrying out the ozonization of the Diels-Alder adduct starting materials in a solvent which is inert with respect to ozone and the ozonide intermediates. Specific examples of suitable solvents include lower alkyl alcohols, such as methanol, ethanol, and propanol, lower fatty acids, such as formic, acetic and propionic acids, lower alkyl esters of lower fatty acids, such as methyl formate, ethyl formate, methyl acetate, ethyl acetate, and methyl propionate, and lower alkyl halides, such as chloroform, carbon tetrachloride, and ethylene chloride. The preferred solvents are methanol and acetic acid.

The particular amount of the inert solvent employed for the ozonization reaction suitably may vary widely. Although solutions having Diels-Alder adduct concentrations of up to 90% may be employed, generally a significant excess of the solvent is utilized, preferably to provide a solution having a concentration of from about 0.1 to about 2 moles of the Diels-Alder adduct per 1000 ml. of solvent.

To carry out the ozonization reaction, ozone is passed through the inert solvent solution of the Diels-Alder adduct to contact the adduct and provide the corresponding ozonide represented in Formula III above. The ozone suitably may be in the form of pure ozone, but preferably is in the form of a mixture of ozone and another gas, such as air, nitrogen and oxygen, with the mixture containing from about 2 to about 15% by volume of ozone.

Although somewhat higher and lower temperatures and pressures suitably may be employed, preferably the ozonization reaction is carried out at atmospheric pressures and at a temperature in the range of from about −20° C. to about 120° C.

The flow rate of the ozone feed stream suitably may vary over a wide range. Usually an ozone flow rate in the range of from about 0.005 to about 0.1 mol/min. preferably from about 0.01 to about 0.05 mol/min., per mol adduct is utilized.

The ozone stream usually is passed through the adduct solution for a time period requisite for no significant further absorption of ozone by the solvent reaction mixture to be observed. Longer time periods may be employed but do not result in any additional benefits. Preferably the passage of the ozone stream is discontinued when the relative amount of ozone absorbed to ozone fed to the reaction solvent mixture falls below about 5%. However, in the case where another reactive group towards $O_3$ is present, e.g., —OH, etc., ozone should not be present in excess. Ordinarily, ozone feed time periods in the range of from about 30 minutes to about 4 hours are used.

The total amount of ozone employed in actual embodiments of the invention will vary depending inter alia upon the particular adduct, type and amount of solvent, and temperature utilized. At the above indicated conditions, the amount of ozone employed generally is such to provide a mol ratio of ozone to adduct in the range of from about 1.0:1 to about 4:1, preferably from about 1.0:1 to about 1.5:1.

The ozonide intermediates thereby prepared are then converted into the desired polyfunctional compounds wherein $X_1$ and $X_2$ are carboxylic groups (Formula IV), hydroxyl methyl groups (Formula V), formyl groups (Formula VI), or aminomethyl groups (Formula VII), by oxidation, reduction, or reductive-amination.

In preparing the embodiments of the invention, wherein $X_1$ and $X_2$ are carboxylic groups, the ozonide intermediate is treated with a molecular excess of oxygen in the presence of water to convert the ozonide to the carboxylic acids represented by Formula IV above. The ozonide preliminarily may be recovered from the reaction mixture prepared in the ozonization reaction, but preferably the reaction mixture is treated directly.

Although any suitable source of molecular oxygen suitably may be employed to convert the ozonide into the desired dicarboxylic acid, preferably the molecular oxygen treatment is carried out by means of an acidic aqueous solution of hydrogen peroxide. The preferred embodiment of the acidic hydrogen peroxide solution utilized is formed by a mixture of about equal volumes of 0.5–1.2 M sulfuric acid and an aqueous 30–60% hydrogen peroxide solution.

The treatment of the ozonide intermediate with molecular oxygen suitably may be carried out over widely ranging temperatures although temperatures below ambient extend the reaction time. Ambient and slightly elevated temperatures are preferred for use. At such temperatures conversion of the ozonide to the carboxylic acid derivatives generally is accomplished within time period ranging from about 15 minutes to about 3 hours. The utilization of the above described aqueous sulfuric acid-hydrogen peroxide solutions favors the shorter conversion times.

For the preparation of the embodiments of the compounds of the invention wherein $X_1$ and $X_2$ are formyl groups, the ozonide intermediate may be treated with hydrogen in the presence of a hydrogenation catalyst to effect a selective reduction of the ozonide intermediate to the corresponding aldehyde represented by Formula VI shown hereinabove.

Preliminary to the treatment of the ozonide intermediate with hydrogen, the ozonide may be recovered from the ozonization reaction mixture, but preferably the ozonide-containing mixture obtained from the ozonization step is treated directly.

In carrying out the hydrogenation of the ozonide intermediates, a conventional hydrogenation catalyst such as platinum or Raney nickel is employed. The amount of the catalyst utilized generally is in the range of from about 0.1% to about 10%, and preferably from about 1% to about 5%, by weight of the ozonide.

The actual amount of hydrogen employed in the hydrogenation reaction depends upon inter alia the particular ozonide and catalyst employed. Generally, an amount of hydrogen providing a mol ratio of hydrogen to ozonide of from about 1:1 to about 1.5:1 is utilized.

While widely ranging temperatures and pressures suitably may be employed in the hydrogenation of the ozonide, usually ambient temperatures and pressures are employed.

For the preparation of the embodiments of the compounds of the invention wherein $X_1$ and $X_2$ are hydroxymethyl groups, the ozonide intermediate is subjected to a selective catalytic hydrogenation treatment similar to that described hereinabove which is employed to form the aldehyde derivatives but the hydrogenation is continued with approximately three times as much hydrogen being consumed to convert the ozonide to the hydroxy-substituted derivatives represented by Formula V.

The preparation of the compounds of the invention wherein $X_1$ and $X_2$ are aminomethyl groups from the ozonide intermediates may be carried out by treating the ozonides with ammonia and hydrogen in the presence of an appropriate catalyst, such as Raney nickel, to effect a reductive-amination of the ozonides and convert the ozonides to the amine derivatives represented by Formula VII above.

The polyfunctional compounds of the invention advantageously are adapted to be utilized as curing and cross-linking agents for synthetic polymers having reactive sites, such as polyurethanes, polyureas, epoxy resins and the like to provide final polymers displaying excellent flexibility and pliability. The polyfunctional compounds of the invention further find utility as plasticizers, intermediates for specialty chemicals, and adhesive formulation additives.

The invention having been described in detail, the following examples are given to show further specific embodiments thereof.

Example I

A 1.5 g. sample of the Diels-Alder adduct of maleic anhydride and a mixture of 9,11- and 10,12-octadecadienoic acids was dissolved in about 50 ml. of acetic acid. A gaseous mixture of ozone and oxygen containing about 6% by volume ozone was then bubbled through the resulting solution at a flow rate of about 60 mg. ozone/min. until about 0.372 g. (about a 90% excess) of ozone had been absorbed by the reaction solution. A mixture of about 5 ml. of 1 N sulfuric acid and about 5 ml. of a 50% hydrogen peroxide aqueous solution was then added to the ozone-treated solution and the resultant mixture was refluxed for about 30 minutes. At the end of this time period, the resulting reaction mixture was poured into about 100 ml. of water and the aqueous mixture was extracted with methylene chloride. The methylene chloride extract obtained was then treated with silver nitrate to decompose any peroxide present, and thereafter the solvent was evaporated to provide a crude product. The crude product was purified by redissolving it in about 10 ml. of methylene chloride, washing the resultant solution with water, and evaporating the washed solvent solution to dryness. The product thereby obtained was a mixture of

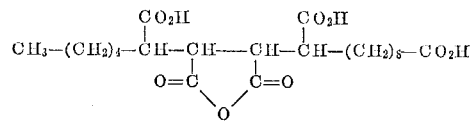

and

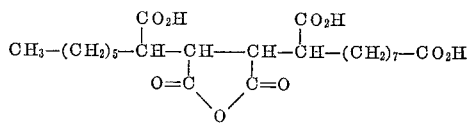

We claim:
1. A polyfunctional compound represented by the formula

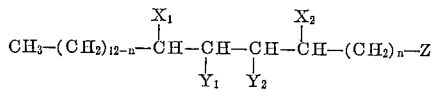

wherein $n$ is an integer of from 1 to 11 inclusive; each of $Z$, $X_1$ and $X_2$ is a —$CO_2H$ radical; each of $Y_1$ and $Y_2$ is a —$CO_2H$ radical, and wherein $Y_1$ and $Y_2$ when taken together form a bivalent radical —$Y_1$—$Y_2$— which is

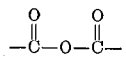

2. A polyfunctional compound according to claim 1 wherein $X_1$, $X_2$, and $Z$ all are —$CO_2H$, and $Y_1$ and $Y_2$ together form the bivalent radical

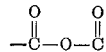

3. The polyfunctional compound according to claim 2 wherein $n$ is 7.

4. The polyfunctional compound according to claim 2 wherein $n$ is 8.

5. A polyfunctional compound according to claim 1 wherein $X_1$, $X_2$, $Y_1$, $Y_2$ and $Z$ all are —$CO_2H$.

6. The polyfunctional compound according to claim 5 wherein $n$ is 7.

7. The polyfunctional compound according to claim 5 wherein $n$ is 8.

References Cited

UNITED STATES PATENTS 3,036,093    5/1962    Lynn et al. _____ 260—346.8

ALEX MAZEL, Primary Examiner

B. I. DENTZ, Assistant Examiner

U.S. Cl. X.R.

260—2, 30.4, 31.8, 47, 77.5, 78.4, 537

PO-1050
(5/69)

UNITED STATES PATENT OFFICE
CERTIFICATE OF CORRECTION

Patent No. 3,466,302          Dated September 9, 1969

Inventor(s) Garson P. Shulman and Freeman M. Young

It is certified that error appears in the above-identified patent and that said Letters Patent are hereby corrected as shown below:

In Column 3, line 7, "$-CH_2OCS_2CH_3$" should read -- $-CH_2OCH_2CH_3$ --.

In Column 3, line 70, the right end of Formula (VI) reading "$(CH_2)_n-H$" should read -- $(CH_2)_n-Z$ --.

In Column 4, line 20, the portion of the formula reading "$-CH_2H$" should read -- $-CO_2H$ --.

In Column 4, lines 35 and 36, the portion of the formula reading "$-CH_2)_7-\overset{Cl}{\underset{|}{C}}-NH_2$" should read -- $-(CH_2)_7-\overset{O}{\overset{\|}{C}}-NH_2$ --.

SIGNED AND
SEALED
JUN 30 1970

(SEAL)
Attest:

Edward M. Fletcher, Jr.
Attesting Officer

WILLIAM E. SCHUYLER, JR.
Commissioner of Patents